United States Patent [19]
Lin

[11] Patent Number: 5,926,249
[45] Date of Patent: Jul. 20, 1999

[54] PAIR OF GLASSES

[76] Inventor: Pei-Tsung Lin, No.11, Kuo-Chung 2nd Road, Ta-Li City, Tauchung Hsien, Taiwan

[21] Appl. No.: 09/127,968

[22] Filed: Aug. 3, 1998

[51] Int. Cl.[6] .................................................. G02C 1/00
[52] U.S. Cl. ............................ 351/83; 351/105; 351/110; 351/140
[58] Field of Search ............................ 351/83–86, 90–94, 351/97–105, 107–110

[56] References Cited

U.S. PATENT DOCUMENTS 4,674,852  6/1987  Tanaka ...................................... 351/90

Primary Examiner—Huy Mai
Attorney, Agent, or Firm—Rosenberg, Klein & Bilker

[57] ABSTRACT

A pair of glasses including two outer butts, two inner butts, a bridge and two movable rim assemblies. Each outer butt has two stopper plates each being formed with a longitudinal channel in which the movable rim assembly is inserted. Each inner butt also has a longitudinal channel in which the movable rim assembly is inserted. By means of the longitudinal channels of the stopper plates of the outer butts and the longitudinal channels of the inner butts, the upper or lower rims of the movable rim assemblies can be fixed with the lenses. Therefore, the glasses can be changed between full rim pattern, upper half rim pattern, lower half rim pattern and rimless pattern.

3 Claims, 7 Drawing Sheets

PAIR OF GLASSES

BACKGROUND OF THE INVENTION

The present invention relates to a pair of glasses which can be changed to full rim pattern, upper half rim pattern, lower half rim pattern or rimless pattern.

The existing glasses can be divided into full rim pattern, upper half rim pattern, lower half rim pattern and rimless pattern. In order to meet different demands of different consumers, a glasses store must prepare various kinds of full rim pattern, upper half rim pattern, lower half rim pattern and rimless pattern of glasses for a consumer to choose. Therefore, the glasses store must store many pairs of glasses. In addition, the above various types of glasses cannot be freely changed in pattern. For example, the full rim glasses cannot be changed into rimless ones and the upper rim glasses cannot be changed into lower rim glasses. In the case that the consumer desires to have various patterns, he/she must purchase many pairs of glasses with different rims. This inevitably increases expense.

SUMMARY OF THE INVENTION

It is therefore a primary object of the present invention to provide a pair of glasses in which by means of the longitudinal channels of the stopper plates of the outer butts and the longitudinal channels of the inner butts, the upper or lower rims can be selectively fixed with the lenses. Therefore, the glasses can be changed between full rim pattern, upper half rim pattern, lower half rim pattern and rimless pattern to meet various demands of a consumer without increasing expense.

It is a further object of the present invention to provide the above glasses by which the amount of stored glasses of a glasses store can be reduced.

According to the above objects, the pair of glasses of the present invention includes:

- two outer butts, each having a rear side pivotally connecting with a temple, each of the outer butts having a coupling section fixed on outer side of a lens, a top section and a bottom section of the outer butt being respectively formed with an upper and a lower fixing dents adjacent to the lens, two stopper plates being respectively secured on the two fixing dents by screws, the screws being not coaxial with each other, the two stopper plates being respectively formed with two longitudinal channels on lateral sides adjacent to the lens, each of the upper and lower stopper plates respectively further having at least one stopping socket communicating with the longitudinal channels;
- two inner butts each having a coupling section fixed on inner side of the lens, the inner butt having a longitudinal channel on lateral side adjacent to the lens, a middle section of the longitudinal channel having a through hole passing through the longitudinal channel to the other side, a top and a bottom section of the through hole each having at least one stopping socket communicating with the longitudinal channel, a bottom end of the inner butt being disposed with a nose piece bracket connecting with a nose piece;
- a bridge positioned between the two inner butts, two ends of the bridge respectively passing through the through holes of the inner butts to overlie on and couple with the coupling sections of the inner butts for fixing the lens; and
- two movable rim assemblies each having an upper rim and a lower rim, each end of the upper and lower rims being formed with a projection, the projections on inner sides of the upper and lower rims being fitted into the stopping sockets of the inner butts, the projections on outer sides of the upper and lower rims being fitted into the stopping sockets of the upper and lower stopper plates.

The present invention can be best understood through the following description and accompanying drawings, wherein:

DETAILED DESCRIPTION OF THE PREFERRED EMBODIMENT

Figure 1:
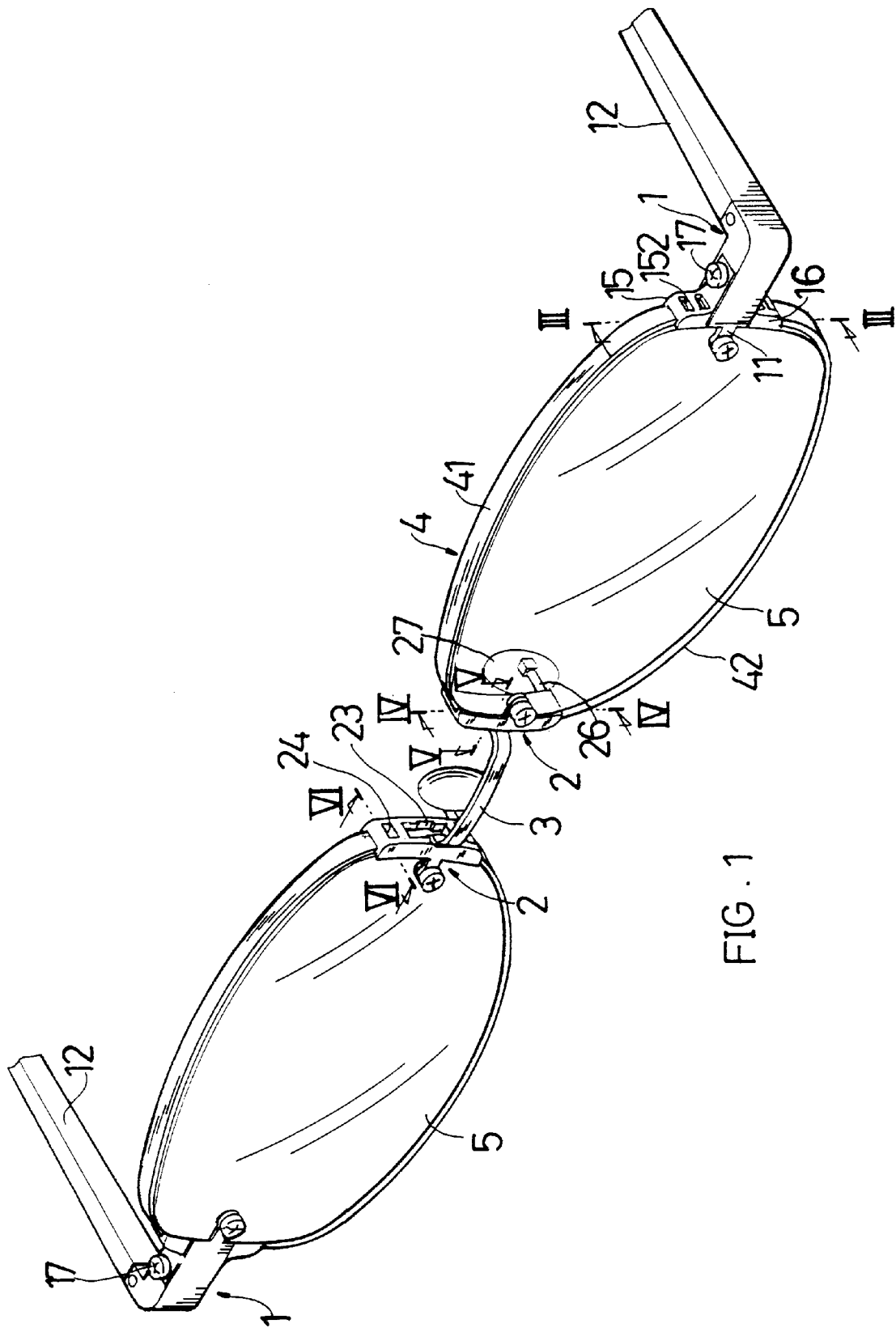
FIG. 1 is a perspective assembled view of the present invention.
Figure 2:
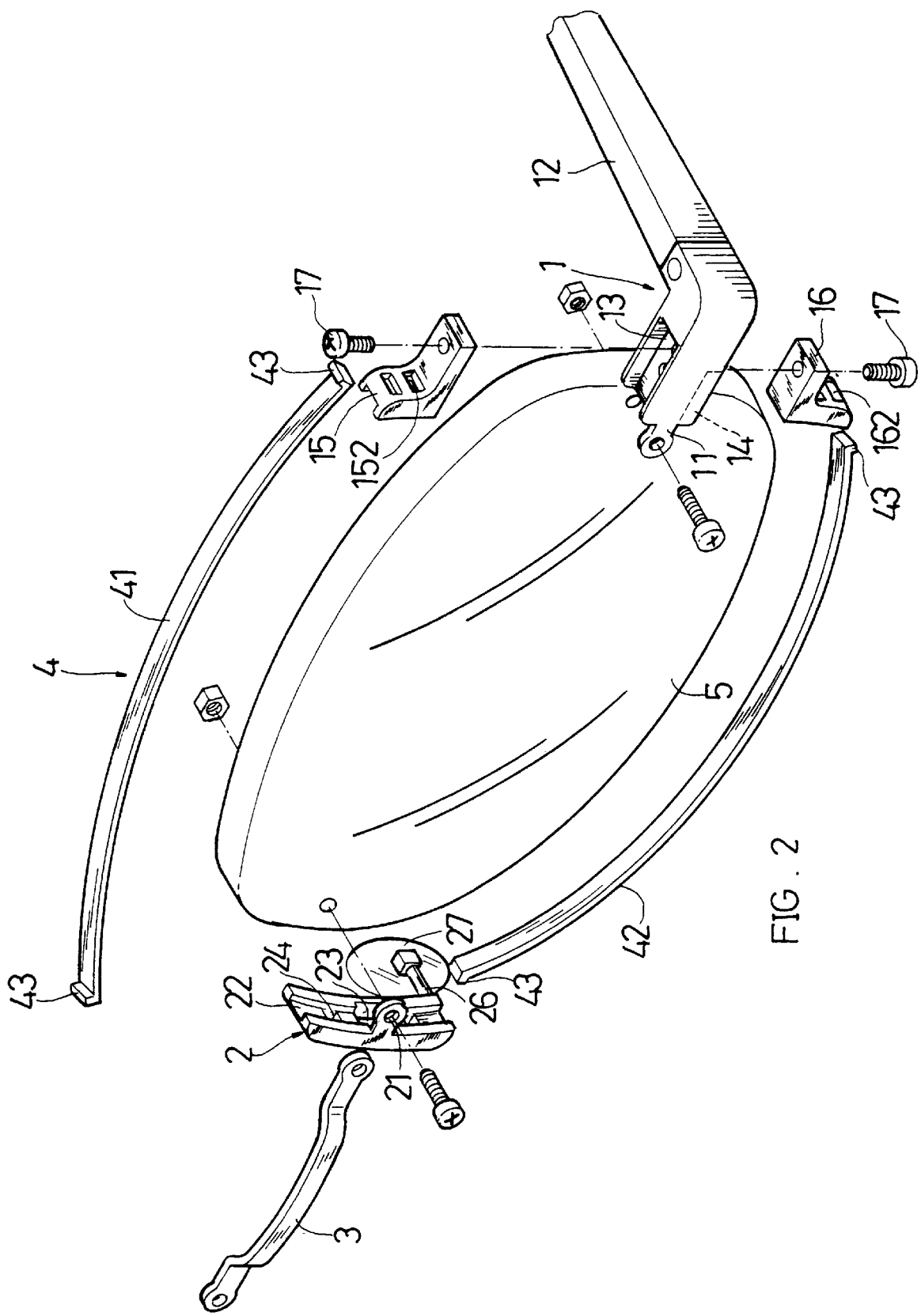
FIG. 2 is a perspective exploded view of the present invention.
Figure 3:
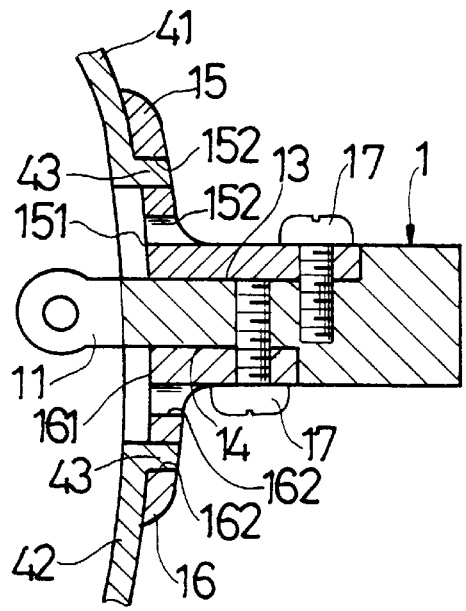
FIG. 3 is a sectional view taken along line III—III of FIG. 1.
Figure 4:
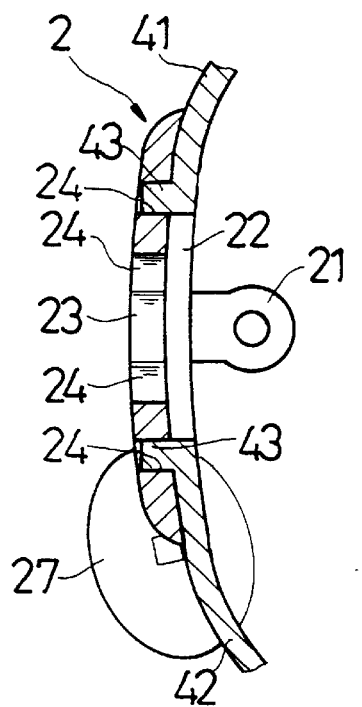
FIG. 4 is a sectional view taken along line IV—IV of FIG. 1.
Figure 5:
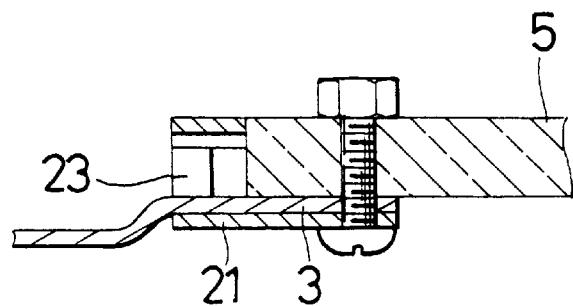
FIG. 5 is a sectional view taken along line V—V of FIG. 1.
Figure 6:
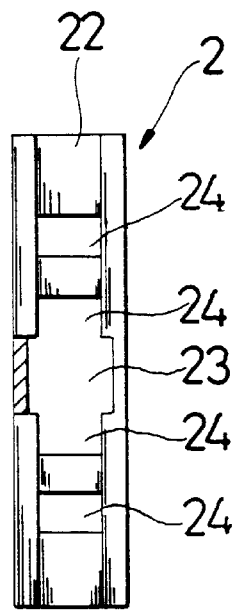
FIG. 6 is a sectional view taken along line VI—VI of FIG. 1.

Please refer to FIGS. 1 to 9. The present invention includes:

- two outer butts 1 each having a coupling section 11 fixed on outer side of a lens 5, a rear side of the outer butt 1 being pivotally connected with a temple 12, a top section of the outer butt 1 being formed with an upper fixing dent 13 adjacent to the lens 5, the upper fixing dent 13 having an open top side and an open lateral side adjacent to the lens 5, a bottom section of the outer butt 1 being formed with a lower fixing dent 14 adjacent to the lens 5, the lower fixing dent 14 having a length longer than that of the upper fixing dent 13, the lower fixing dent 14 having an open bottom side and an open lateral side adjacent to the lens 5, an upper stopper plate 15 being secured in the upper fixing dent 13 by a screw 17, a lower stopper plate 16 being secured in the lower fixing dent 14 by another screw 17, the two screws 17 being not coaxial with each other, the upper and lower stopper plates 15, 16 being respectively formed with two longitudinal channels 151, 161 on lateral sides adjacent to the lens 5, the upper and lower stopper plates 15, 16 respectively further having two stopping sockets 152, 162 near an end section of the outer butt 1 and communicating with the longitudinal channels 151, 161;
- two inner butts 2 each having a coupling section 21 fixed on inner side of the lens 5, the inner butt 2 having a downward extending longitudinal channel 22 adjacent to the lens 5, a middle section of the longitudinal channel 22 having a widened through hole 23 passing through the longitudinal channel 22 to the other side, a top and a bottom section of the through hole 23 respectively having two stopping sockets 24 communicating with the longitudinal channel 22, the bottom end of the inner butt 2 being disposed with a nose piece bracket 26 connecting with a nose piece 27;

a slightly curved bridge 3 positioned between the two inner butts 2, two ends of the bridge 3 respectively passing through the through holes 23 of the inner butts 2 to overlie on and couple with the coupling sections 21 of the inner butts 2 on front side of the lens 5 for fixing the lens 5; and two movable rim assemblies 4 each having an upper rim 41 and a lower rim 42. The upper and lower rims 41, 42 are slightly bent. In this embodiment, the upper and lower rims 41, 42 are made of flexible metal material. Each end of the upper and lower rims 41, 42 is formed with a projection 43. The projections 43 on inner sides of the upper and lower rims 41, 42 are fitted into the stopping sockets 24 of the inner butts 2. The projections 43 on outer sides of the upper and lower rims 41, 42 are fitted into the stopping sockets 152, 162 of the upper and lower stopper plates 15, 16.

Figure 7:
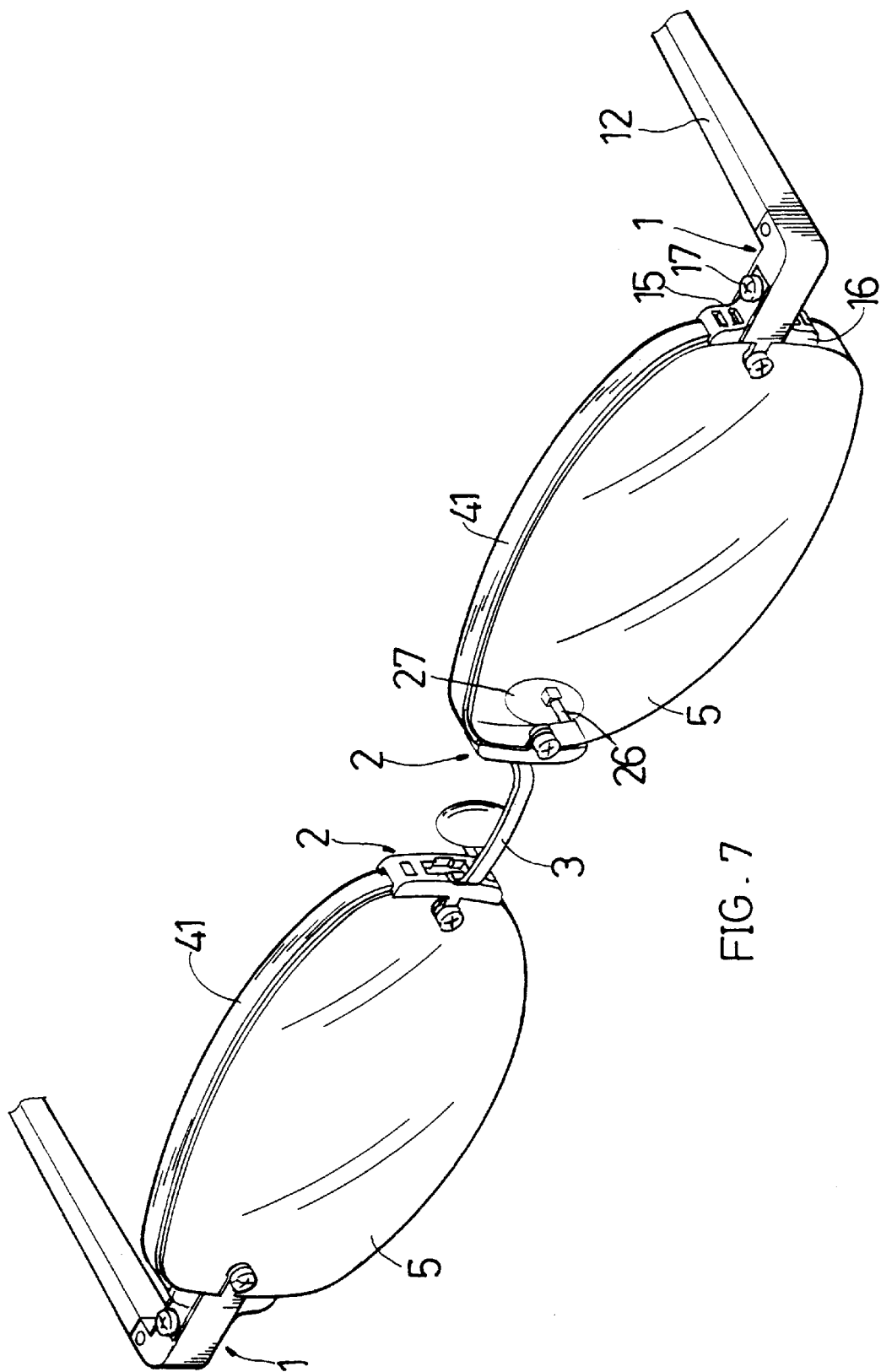
FIG. 7 is a perspective view showing the upper half rim pattern of the glasses of the present invention.
Figure 8:
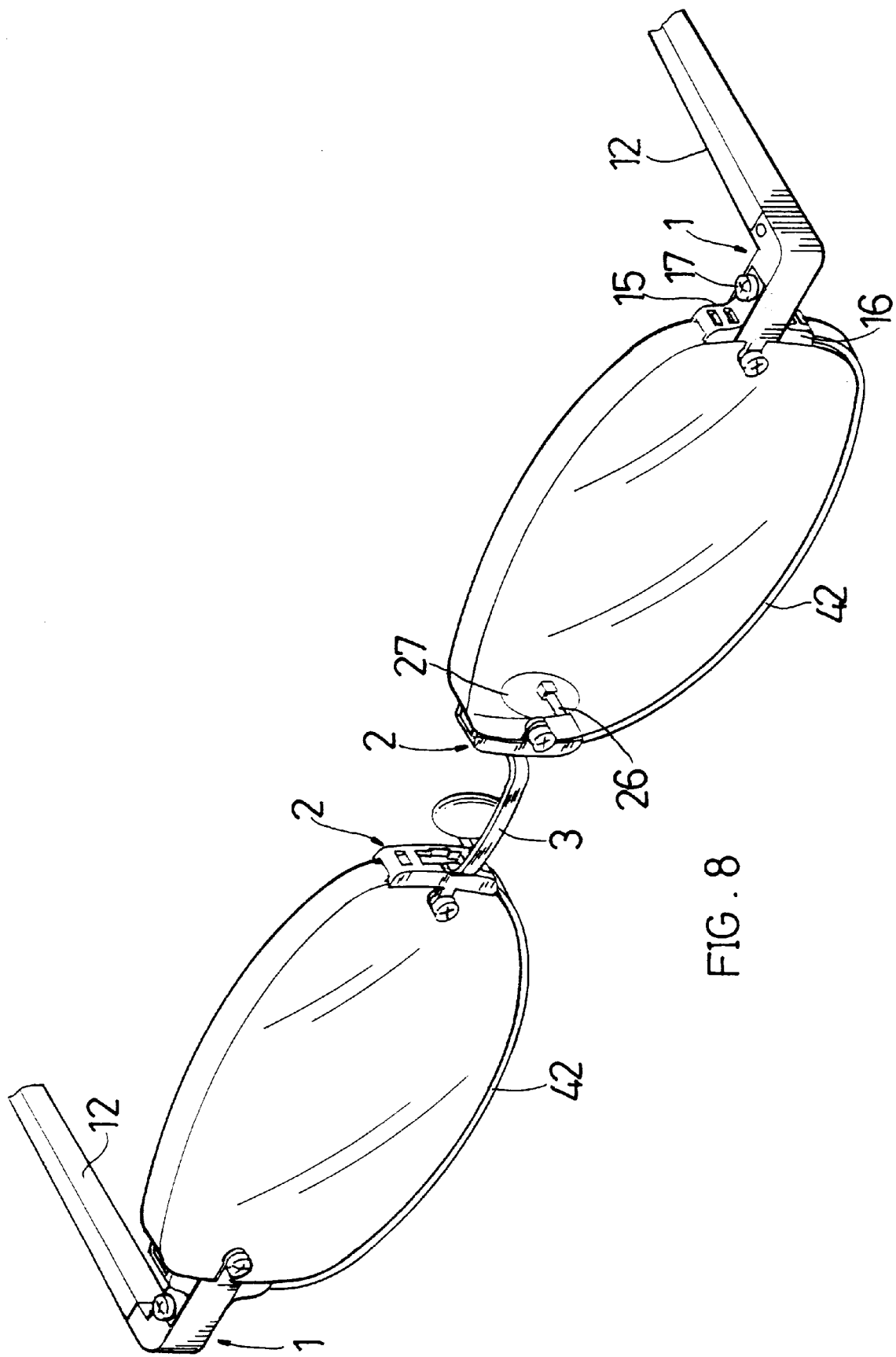
FIG. 8 is a perspective view showing the lower half rim pattern of the glasses of the present invention.
Figure 9:
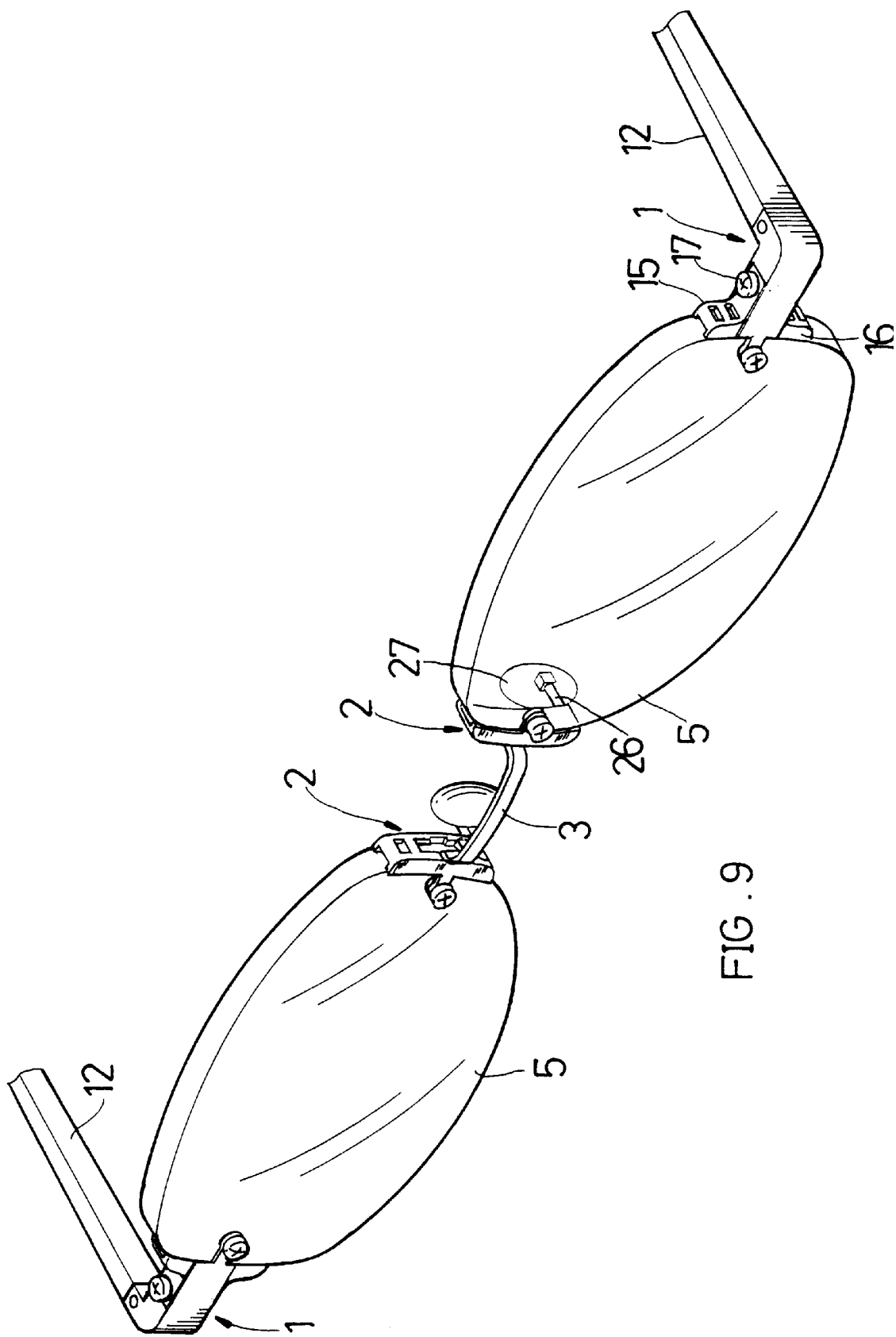
FIG. 9 is a perspective view showing the rimless pattern of the glasses of the present invention.

Please refer to FIGS. 1 and 7 to 9. When a consumer needs to wear a pair of glasses, the consumer can first select a full rim (as shown in FIG. 1), an upper half rim (as shown in FIG. 7), a lower half rim (as shown in FIG. 8) or a rimless pattern (as shown in FIG. 9). In the case that the consumer selects the rimless pattern, only the outer butts 1 and inner butts 2 are locked on the lenses 5. Prior to locking of the inner butts 2, the bridge 3 is passed through the through hole 23 to be locked with the coupling section 21. Accordingly, a pair of rimless glasses are formed. However, the movable rim assemblies 4 can be sold to the consumer together with the rimless glasses. Therefore, the consumer can assemble the movable rim assemblies with the original rimless glasses to change the pattern thereof as desired. With the upper half rim glasses of FIG. 7 exemplified, the consumer only needs to untighten the two upper stopper plates 15 and two inner butts 2 and respectively insert two ends of the upper rim 41 into the longitudinal channels 151, 22. Then, with the length of the upper rim 41 snugly attached to the upper edge of the lens 5, the projections 43 are respectively engaged in the stopping sockets 152, 24.

According to the above arrangement, a consumer can vary the pattern of the glasses as necessary without purchasing various types of glasses. Moreover, a glasses store no more needs to store various patterns of glasses.

It is to be understood that the above description and drawings are only used for illustrating one embodiment of the present invention, not intended to limit the scope thereof. Any variation and derivation from the above description and drawings should be included in the scope of the present invention.

What is claimed is:

1. A pair of glasses comprising:

two outer butts, each having a rear side pivotally connecting with a temple, each of outer butts having a coupling section fixed on outer side of a lens, a top section and a bottom section of the outer butt being respectively formed with an upper and a lower fixing dents adjacent to the lens, upper and lower stopper plates being respectively secured on the two fixing dents by screws, the screws being not coaxial with each other, the upper and lower stopper plates being respectively formed with two longitudinal channels on lateral sides adjacent to the lens, each of the upper and lower stopper plates respectively further having at least one stopping socket communicating with the longitudinal channels;

two inner butts each having a coupling section fixed on inner side of the lens, the inner butt having a longitudinal channel on lateral side adjacent to the lens, a middle section of the longitudinal channel having a through hole passing through the longitudinal channel to the other side, a top and a bottom section of the through hole each having at least one stopping socket communicating with the longitudinal channel, a bottom end of the inner butt being disposed with a nose piece bracket connecting with a nose piece;

a bridge positioned between the two inner butts, two ends of the bridge respectively passing through the through holes of the inner butts to overlie on and couple with the coupling sections of the inner butts for fixing the lens; and two movable rim assemblies each having an upper rim and a lower rim, each end of the upper and lower rims being formed with a projection, the projections on inner sides of the upper and lower rims being fitted into the stopping sockets of the inner butts, the projections on outer sides of the upper and lower rims being fitted into the stopping sockets of the upper and lower stopper plates.

2. A pair of glasses as claimed in claim 1, wherein the upper and lower rims are made of flexible metal material.

3. A pair of glasses as claimed in claim 1, wherein the through hole of the inner butt has a width wider than that of the longitudinal channel of the inner butt.

\* \* \* \* \*